United States Patent [19]

Clapp et al.

[11] 4,243,347
[45] Jan. 6, 1981

[54] BROACHING ASSEMBLY HAVING DISPOSABLE CARBIDE INSERTS

[75] Inventors: Keith A. Clapp, Troy, Mich.; Donald A. Stewart, Boxford, Mass.

[73] Assignee: General Electric Company, Worthington, Ohio

[21] Appl. No.: 16,278

[22] Filed: Feb. 28, 1979

[51] Int. Cl.³ .............................................. B26D 1/12
[52] U.S. Cl. ..................................................... 407/15
[58] Field of Search ....................... 407/15, 17, 18, 19, 407/36, 49, 66, 102, 107, 108, 109, 110, 111, 112, 117, 119

[56] References Cited

U.S. PATENT DOCUMENTS

| | | | |
|---|---|---|---|
| 1,440,933 | 1/1923 | Perkins et al. | 407/17 |
| 2,378,094 | 6/1945 | Nunes-Vaz | 407/112 |
| 2,439,822 | 4/1948 | Phaneuf | 407/15 |
| 2,585,832 | 2/1952 | Phaneuf | 407/17 |
| 2,846,756 | 8/1958 | Novkov | 407/118 |
| 2,855,656 | 10/1958 | Poynter | 407/17 |
| 2,930,111 | 3/1960 | St. Clair | 407/36 |
| 3,662,443 | 5/1972 | Schmidt | 407/17 |

Primary Examiner—Harrison L. Hinson
Attorney, Agent, or Firm—Morgan, Finnegan, Pine, Foley & Lee

[57] ABSTRACT

A broach system comprises a plurality of disposable carbide inserts which are precisely positioned and secured within the slot of a broach holder. An elongated side clamp having a shaped contact surface is located along one side of the slot on a sloping surface of the holder. The side clamp is tightened camming the inserts against the side and bottom locating surfaces of the holder. A front clamp is also mounted to the holder and tightened which forces the inserts against a rear stop on the holder. Several holders may be readily assembled in series to perform a complete broaching operation such as dovetail forms in super high strength materials used in gas turbine engines. The broach system replaces the conventional broach design of brazed construction wherein carbide blanks are permanently fastened to a steel holder and it is an improvement over conventional mechanically held inserts. As advantages, the system reduces down time and set-up time. Also, there is lower risk of insert breakage and a resultant increase in tool life.

14 Claims, 6 Drawing Figures

BROACHING ASSEMBLY HAVING DISPOSABLE CARBIDE INSERTS

BACKGROUND OF THE INVENTION

The present invention relates to broach systems and particularly to a new and improved broach cutter assembly having disposable carbide inserts.

Broach tools have been used for many years for the machining of metal, and for specific operations such as broaching slots, openings or channels of specialized cross-section which are typically formed in turbine wheel discs. The conventional broaching tool has been a unitary broach having a plurality of cutting teeth formed on a single solid stick-like member. Several shortcomings, however, have been associated with the use of such stick-like broaches. For example, the quality of the overall tool is only as good as the worst tooth, with the existence of an undersized tooth resulting in an overloading of the next tooth, as well as making it necessary, through wear or otherwise, to discard the entire tool even though there is still useful life left in many or all of the other teeth. Of course, the entire tool is also lost as the result of any tooth damage or cracking with respect to any one tooth or any one part of the tool. In addition, the type of material from which the tool is made is restricted. More particularly, while high speed steels have been used to form the stick-like broaches, tougher, more expensive materials such as carbides cannot be used because of the prohibitive costs associated with the initial manufacture of the tool, as well as the cost of replacements necessitated by the fact that damage to any one part of the tool requires that it be discarded.

Another type of broaching tool which has been used is one which includes a plurality of separate cutting inserts which are fixed to the tool body. Typically, the inserts are formed from a cemented carbide or other hard metal. The conventional design for tools of this type is generally of brazed construction, i.e. carbide blanks are permanently fastened to a steel holder with braze material and ground after brazing to the required cutter configuration. Proper brazing of the carbide to the steel along with grinding the carbide after brazing is critical, yet due to space limitations, is extremely difficult. The brazing of the carbide tips requires that each be held in proper position during the braze procedure to facilitate grinding to form after brazing. Furthermore, it is necessary for a successful broaching operation that each tip is securely and properly brazed to the steel body. Unfortunately, it is often common for a brazed joint to come apart in the grinding operation or in the actual broaching of the part. In either event, if the carbide tip breaks, a new tip must be rebrazed and the form reground. The conventional brazed construction thus offers little advantage over high speed tooling since downtime and requalifying of a broach set is a lengthy process. In addition to broaches having brazed inserts, there are tools in which the cutting inserts are in some way clamped to the tool. Examples of such tools are disclosed in U.S. Pat. No. 3,707,748 to Price et al, issued Jan. 2, 1973, and entitled "Cutting Tool For Holding A Plurality Of Disposable Cutting Inserts;" U.S. Pat. No. 3,548,474 to Meyer, issued Dec. 22, 1970, and entitled "Machine Tool;" U.S. Pat. No. 3,641,642 to Schmidt, issued Feb. 15, 1972, and entitled "Individual Tooth Broach;" U.S. Pat. No. 3,528,154 to Schmidt, issued Mar. 28, 1968, and entitled "Individual Tooth Broach;" and Russian Pat. No. 727357/25 to Komler, issued Apr. 19, 1961 and entitled "Assembled Broach For Complex Profiles."

It is an object of the present invention to provide a new and improved broach system having disposable carbide inserts which are mounted in a series within a slot in a holder and cammed into position by clamp means.

A more specific object of this invention is to provide a new and improved broach system for broaching dovetail slots in turbine wheel discs wherein disposable carbide inserts are positioned within a slot in a broach holder and clamped in place by means of side and front clamps which also precisely position the inserts against particularly configured surfaces of the holder.

SUMMARY OF THE INVENTION

The present invention pertains to a new and improved broach system having disposable carbide inserts precisely positioned and fastened within the slot of a holder. Accordingly, a series of disposable inserts are placed within the slot of a holder and cammed into position against the opposed walls of the slot by an elongated side clamp and bolt arrangement. The contact surface of the side clamp automatically forces the inserts against the side and bottom locating surfaces of the holder. A front clamp is also employed to force the inserts against a rear stop. Thus, the broach system is rapidly assembled without the time-consuming operations required by brazed assemblies or the complicated arrangements of the prior art. The broach assembly is ideally suited for broaching dovetail grooves particularly in gas turbine engine, turbine wheel discs.

DETAILED DESCRIPTION OF THE PREFERRED EMBODIMENTS

Figures 1, 6:
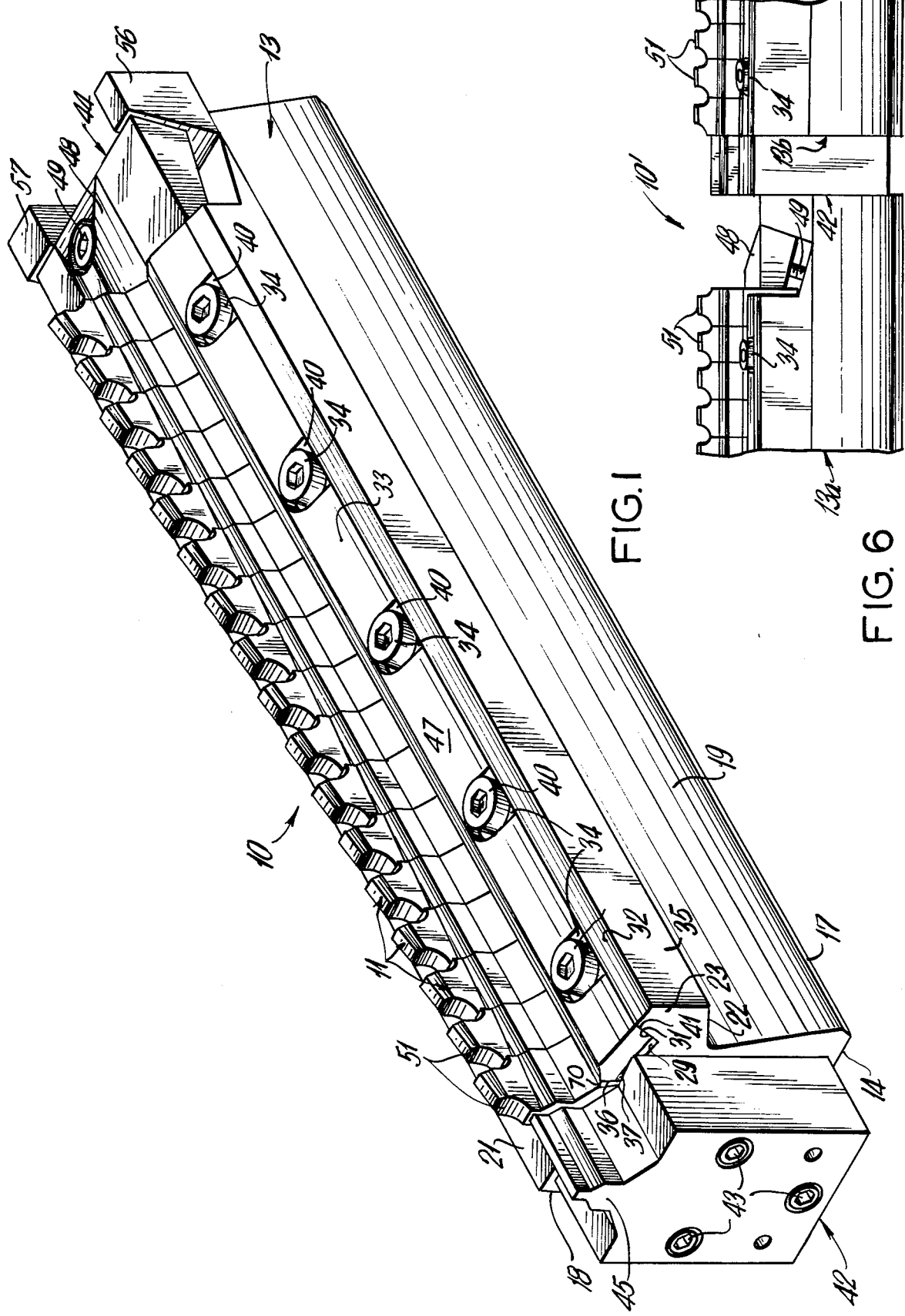
FIG. 1 is a perspective view of the broach system comprising the invention.
Figure 2:
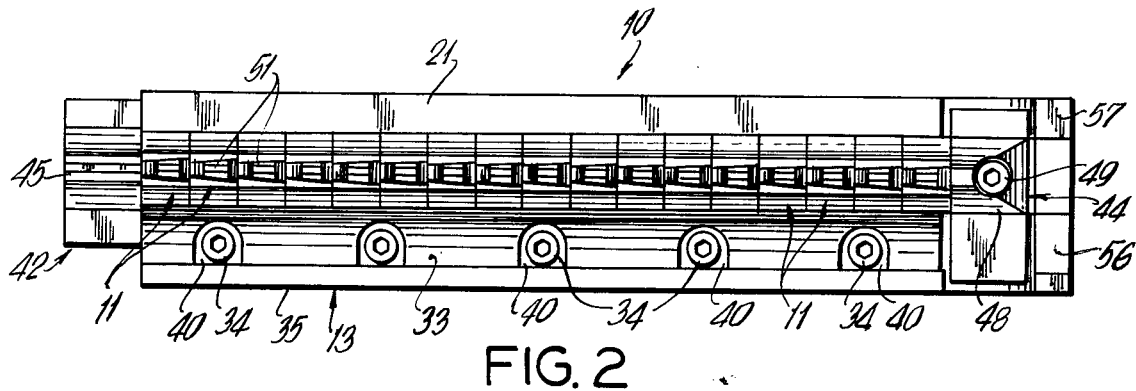
FIG. 2 is a plan view showing the broach system of the invention.
Figure 3:
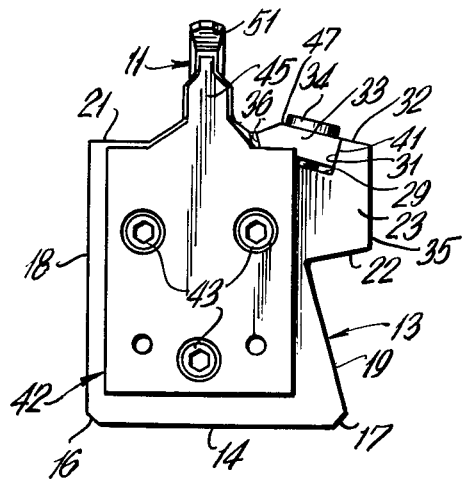
FIG. 3 is a rear end view of the broach system with the end clamp in place.

Referring now to the figures, the broach cutter assembly of the subject invention is designated generally by reference numeral 10, and it includes an elongated holder member 13 having a base 14, an upper end surface 21 opposed to base 14, and upwardly extending side walls 18 and 19 joining base 14 and upper end surface 21. Wall 18 is preferably substantially perpendicular to base 14 and terminates at an upper surface 21. Wall 19 preferably extends inwardly from base 14 at an angle of approximately 10° from the vertical and terminates at a sloped wall 22 of an outwardly protruding portion 23. In addition, it is preferable that base 14 include chamfered edges 16 and 17.

Figure 4:
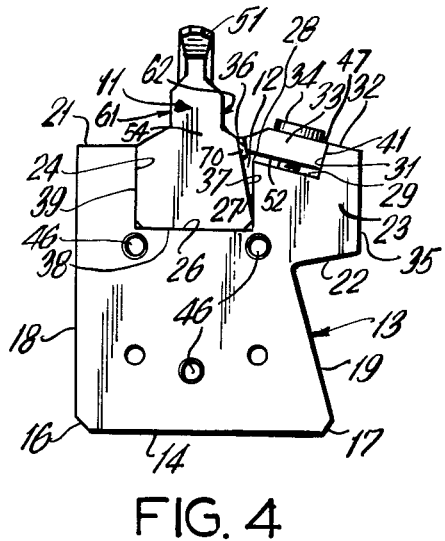
FIG. 4 is a rear end view of the broach system similar to FIG. 3 with the end clamp removed.
Figure 5:
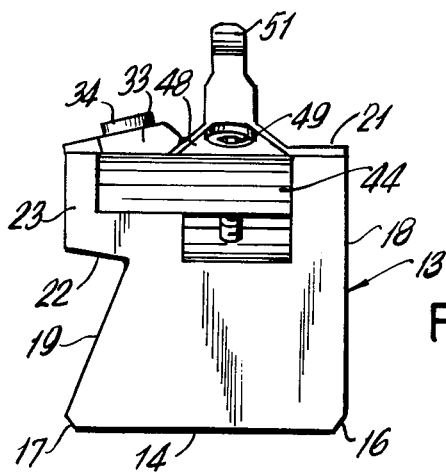
FIG. 5 is a front end view of the broach system looking in the opposite direction from FIG. 3 which shows a rear end view, and, FIG. 6 is a partial side view showing two holders arranged in series as is customary in performing a complete broaching operation.

Referring specifically to the FIGS. 1 and 4, end surface 21 of holder 13 includes a longitudinal, generally U-shaped slot 12 for receiving a plurality of cutting inserts 11. Typically, inserts 11 are formed from a cemented carbide or other hard metal block and they include a base portion 38, a pair of opposed end walls 54, a pair of opposed side walls 61 and 62, and a cutting portion 51. Preferably, side wall 61 of each insert includes a placement wall portion 39 which is disposed substantially perpendicular to insert base portion 38. In addition, it is preferable that insert side wall 62 include a sloped clamping wall portion 37 opposed to placement wall portion 39, clamping wall portion 37 sloping inwardly relative to insert base portion 38. As indicated in the Figures, U-shaped slot 12 includes a generally horizontal support portion 26 for engaging insert base portion 38; a first wall member 24 for engaging insert placement wall portion 39 and serving as a stop against which the inserts may be positioned; and a second wall member 27 which is spaced for a distance from sloped clamping wall portion 37 of the insert. Preferably, first slot wall member 24 is perpendicular to slot base 26 and has a length substantially equal to that of insert placement wall portion 39. In addition, it is preferable that first slot wall 24 be longer than second slot wall 27 with upper terminal point 28 of slot wall member 27 being disposed below holder end surface 21.

Still referring to FIGS. 1 and 4, holder 13 preferably includes a clamp support surface 29 which slopes downwardly from point 28 along the upper surface of protruding portion 23, and terminates at an upwardly extending stop wall 31. Preferably stop wall 31 is disposed substantially perpendicular to clamp support surface 29. A downwardly sloping wall 32 and a generally vertical downwardly extending wall member 35 complete the outer perimeter of projecting portion 23.

Turning now to FIGS. 2-5, the subject assembly 10 further includes a first elongated clamping member, i.e. side clamp 33 which is mounted onto clamp support surface 29, typically by screw means such as bolts 34. Clamping member 33 includes a clamping surface 36 which exerts a force against clamping wall portion 37 of inserts 11 so as to cam the inserts against slot support portion 26 and first slot wall 24, respectively. Preferably, clamping surface 36 is substantially parallel to sloped clamping wall portion 37 of the insert. In addition, it is preferable that a generally rectangular shim member 70, formed from a soft metal such as brass or copper be disposed between clamping surface 36 and insert clamping wall 37. Shim 70 compensates for irregularities which may cause surfaces 36 and 37 to not be flush against one another and thus, prevents slipping of the insert.

Rear end portion 41 of clamping member 33 rests against stop wall 31 for purposes of support. As shown in FIG. 1, a plurality of inserts 11 are positioned and held in place by the clamping member 33 which is secured, in this case, by five bolts 34 set in spaced recesses 40, which engage apertures in the holder 13, the recesses being disposed in upper surface 47 which extends substantially parallel to clamp base portion 52. The inserts 11 are, in effect, cammed into position against the side and bottom surfaces 24 and 26 of the slot 12, with each end wall of one insert being securely flush against the end wall of another insert.

A second clamping member, i.e. front clamp 44 is mounted to the holder 13 at one end thereof and tightened by means of bolt 49 so as to force the inserts 11 against a stop member 42. Preferably, clamp member 44 comprises a pair of bracket-like members 56 and 57 and transverse portion 48 which is secured in position by bolt 49. Stop member 42 which is disposed at the other end of holder 13 is generally rectangular in cross-section, and includes an upwardly protruding portion 45 which seals off the rear end of slot 12 and masks the portion of the insert 11 below the cutting portion 51. Preferably, protruding portion 45 has substantially the same configuration as insert end wall 54.

In a particular operation, one or more broach holders 13a and 13b may be utilized in series, as part of a system 10', as shown in FIG. 6. The cutting portions 51 of the inserts are then graduated accordingly over the total number of holders 13. The inserts 11 shown in the drawings are typical and thus have not been described in detail although it has been noted that such inserts 11 may be used to form dovetail slots in super high strength materials used in gas turbine engines. The clamps 33 and 44 permit the rapid set-up of the broaching tool and provide improved tool performance as well.

In summary, the subject invention provides a new and improved broaching assembly which includes a plurality of separate disposable cutting insert members. The subject assembly is very simple in construction, yet assures a quick and accurate indexing and/or removal of the individual inserts.

It is to be understood that the above-described arrangements are merely illustrative examples of the application. Numerous other arrangements may be readily devised by those skilled in the art which will embody the principles of the invention and fall within the spirit and scope thereof.

What is claimed is:

1. A broach assembly comprising:
   an elongated holder member including: a longitudinal, substantially U-shaped slot for receiving a plurality of cutting inserts, said slot having a support portion and first and second upstanding wall members, each of said cutting inserts having a base, a pair of end walls, and a pair of side walls, one side wall of each insert including a clamping wall portion extending from said insert base to a point intermediate said one side wall, each clamping wall portion sloping from its insert base towards the other side wall of its respective insert; a clamp support surface sloping downwardly and outwardly from said second slot wall member; and a clamp stop wall extending upwardly from said clamp support surface;
   an elongated first clamp member releasably mounted on said clamp support surface and in slideable engagement with said clamp stop wall such that said first clamp member slopes downwardly and outwardly relative to said holder member slot, said first clamp member having a clamping surface disposed adjacent said holder member slot for engaging the sloped clamping wall portion of each of said inserts and exerting a downward and lateral force against said inserts so as to firmly cam said inserts against the support portion and first wall member of said holder member slot;
   means for tightening said first clamp member against the clamping wall portions of said inserts and said clamp stop wall;
   a stop member mounted to the holder at one end of said slot;

a second clamp member mounted on the other end of said slot for firmly positioning said inserts longitudinally against said stop member; and means for tightening said second clamp member against said inserts.

2. A broach assembly in accordance with claim 1 wherein:

the first clamp member comprises an elongated member having a base portion; an upwardly extending rear portion for engaging the stop wall of the holder; an upper surface extending generally parallel to the clamp base portion and having spaced mounting apertures extending therethrough, the clamping surface of said first clamp member being substantially parallel to the clamping wall portion of each insert.

3. A broach assembly in accordance with claim 2 in which the means for tightening said first clamp member against said clamping wall portion of said inserts and said clamp support surface comprises screw means received within said spaced mounting apertures.

4. A broach assembly in accordance with claim 2 which further includes a generally rectangular shim member disposed between the clamping surface of said first clamp member and the clamping wall portion of each insert.

5. A broach assembly in accordance with claim 4 in which said shim member is copper.

6. A broach assembly in accordance with claim 4 in which said shim member is brass.

7. A broach assembly in accordance with claim 1 wherein:

the stop member comprises a substantially rectangular block member for mounting to the end of the broach holder opposite said second clamp member, said stop member having an upwardly extending portion for engaging one of said inserts so as to position said inserts axially along the slot.

8. A broach assembly in accordance with claim 7 wherein:

the upwardly extending portion of said stop member has a configuration substantially the same as that of the end walls of the inserts.

9. A broach assembly in accordance with claim 1 in which said placement wall portion of each insert has substantially the same length as said first slot wall member.

10. A broach assembly in accordance with claim 1 in which the second wall member of said slot has a length less than the first wall member of said slot.

11. A broach assembly in accordance with claim 1 in which said stop wall is disposed substantially perpendicular to said clamp support surface.

12. A broach assembly as recited in claim 1 wherein:

the second clamp member comprises a pair of bracket-like members and means extending transversely across said slot and in slidable engagement with said bracket members for slidably engaging the end wall of one of said inserts; and said second clamp tightening means comprises screw means for fixing said transverse means to the holder and said bracket members and firmly positioning said inserts against said stop member.

13. A broach assembly comprising:

an elongated holder member, said holder member having a longitudinal, substantially U-shaped slot for receiving a plurality of cutting inserts, said slot having a support portion and first and second upstanding wall mebers, each of said cutting inserts having a base, a pair of end walls, and a pair of side walls, one side wall of each insert including a clamping wall portion extending from said insert base to a point intermediate said one side wall, each clamping wall portion sloping from its insert base towards the other side wall of its respective insert; a clamp support surface sloping downwardly and outwardly from said second slot wall member; and a clamp stop wall extending upwardly from said support surface;

an elongated first clamp member releasably mounted on said clamp support surface and in slidable engagement with said clamp stop wall such that said first clamp member slopes downwardly and outwardly relative to said holder member slot, said first clamp member having a clamping surface disposed adjacent said holder member slot for engaging the sloped clamping wall portion of each of said inserts and exerting a downward and lateral force against said inserts so as to firmly cam said inserts against the support portion and first wall member of said holder member slot; p1 a shim member disposed between the clamping surface of said first clamp member and the clamping wall portion of each insert;

means for tightening said first clamp member against said shim member and said clamping wall portions of said inserts and said clamp stop wall;

a stop member mounted to said holder at one end of said slot;

a second clamp member mounted to the holder at the other end of said slot for positioning said inserts against said stop member, said second clamp member including a pair of bracket-like members and means extending transversely across said slot and in slidable engagement with said bracket members for slidably engaging the end wall of one of said inserts; and means for tightening said second clamp including screw means for fixing said transverse means to the holder and said bracket members, and firmly positioning said inserts against said stop member.

14. A broach assembly as in claim 13 wherein said shim member is formed from brass.

* * * * *

UNITED STATES PATENT AND TRADEMARK OFFICE
CERTIFICATE OF CORRECTION

PATENT NO. : 4,243,347
DATED : January 6, 1981
INVENTOR(S) : Clapp, et al.

It is certified that error appears in the above—identified patent and that said Letters Patent is hereby corrected as shown below:

Column 6, line 12, change "mebers" to --members--;

line 34, delete "pl" and indent as a subparagraph beginning with "a shim".

Signed and Sealed this

Twelfth Day of May 1981

[SEAL]

Attest:

RENE D. TEGTMEYER

*Attesting Officer*      *Acting Commissioner of Patents and Trademarks*